United States Patent
Kamada et al.

(10) Patent No.: US 8,749,168 B2
(45) Date of Patent: Jun. 10, 2014

(54) ILLUMINATION LIGHT COMMUNICATION DEVICE, AND ILLUMINATION APPARATUS AND SYSTEM INCLUDING SAME

(75) Inventors: Masao Kamada, Osaka (JP); Eiji Shiohama, Osaka (JP); Hiroyuki Nishino, Osaka (JP); Minoru Maehara, Osaka (JP); Yosiaki Hasitani, Osaka (JP); Yosuke Kondo, Osaka (JP)

(73) Assignee: Panasonic Corporation, Osaka (JP)

( * ) Notice: Subject to any disclaimer, the term of this patent is extended or adjusted under 35 U.S.C. 154(b) by 200 days.

(21) Appl. No.: 13/547,327

(22) Filed: Jul. 12, 2012

(65) Prior Publication Data
US 2013/0015784 A1   Jan. 17, 2013

(30) Foreign Application Priority Data
Jul. 15, 2011   (JP) .................................. 2011-157174

(51) Int. Cl.
*H05B 37/02* (2006.01)
*H05B 39/04* (2006.01)
*H05B 41/36* (2006.01)
*G05F 1/00* (2006.01)
*H04B 10/04* (2006.01)

(52) U.S. Cl.
USPC .......................................... 315/297; 398/182

(58) Field of Classification Search
CPC ... H05B 37/0272; H04B 10/116; H03M 1/00; H03M 2201/01; H03M 2201/194; H03M 2201/2114; H03M 2201/2159; H03M 2201/4125; H03M 2201/4225; H03M 2201/4233; H03M 2201/4262; H03M 2201/847; H03M 2201/848
See application file for complete search history.

(56) References Cited

U.S. PATENT DOCUMENTS

2009/0214225 A1*   8/2009   Nakagawa et al. ............ 398/191
2013/0033194 A1*   2/2013   Kang et al. .................... 315/291

FOREIGN PATENT DOCUMENTS

JP   2011-34713   2/2011

* cited by examiner

*Primary Examiner* — Douglas W Owens
*Assistant Examiner* — Dedei K Hammond
(74) *Attorney, Agent, or Firm* — Renner, Otto, Boisselle & Sklar, LLP

(57) ABSTRACT

An illumination light communication device includes a light source unit including light emitting elements; a power supply unit controlling a load current flowing through the light source unit to be maintained at a constant; a switch element connected in series to the light source unit; and a control unit configured to control on/off of the switch element to modulate a light intensity of illumination light from the light source unit such that a binary communication signal is superimposed on the illumination light. The control unit has a switching circuit to open/close a path between the light source unit and the power supply unit, controls on/off of the switching circuit based on a dimming signal to perform a dimming control on the light source unit by a PWM control, and allows the communication signal to be superimposed on the illumination light in synchronization with an ON time of the switching circuit.

14 Claims, 9 Drawing Sheets

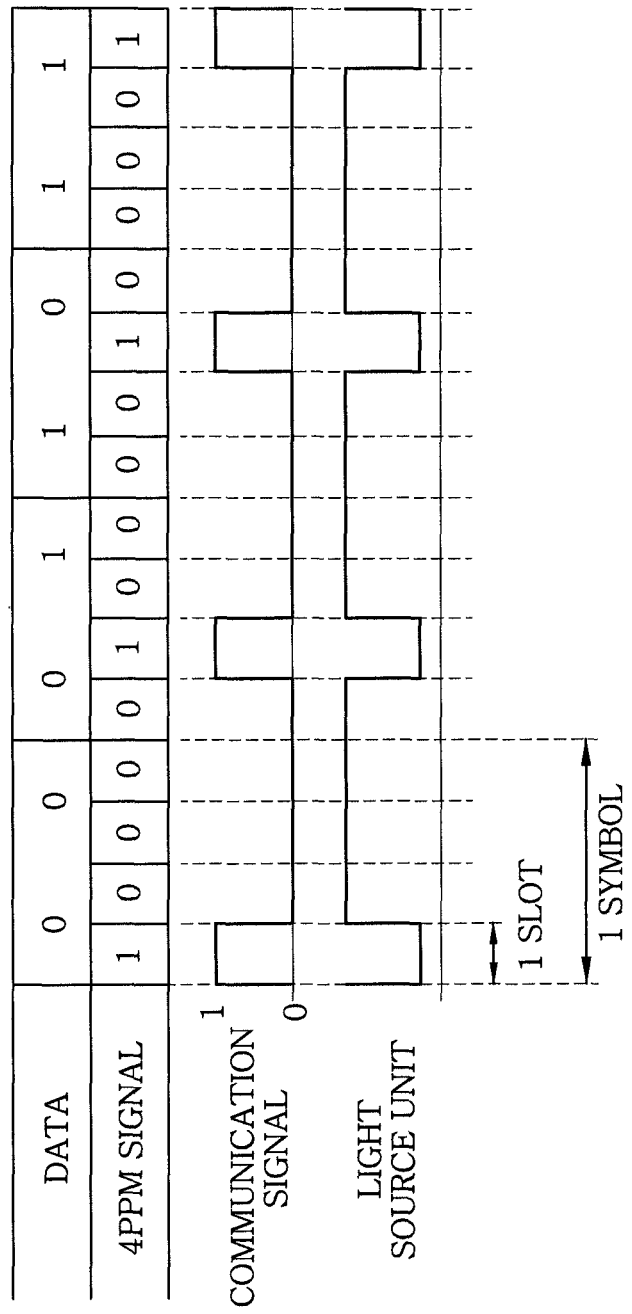

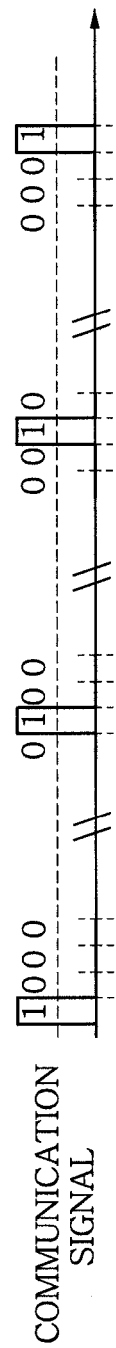
FIG.3A  COMMUNICATION SIGNAL
FIG.3B  LOAD CURRENT

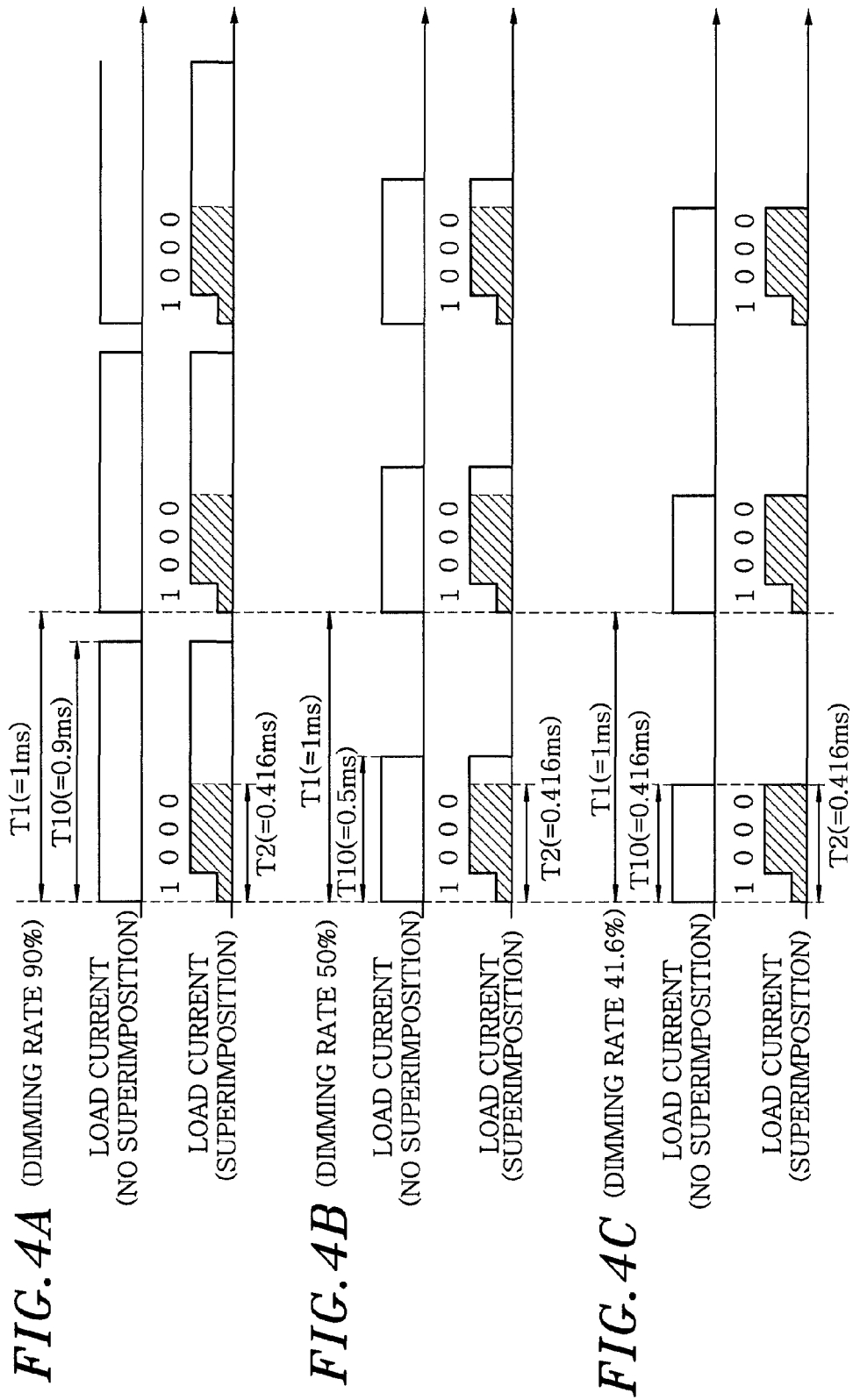

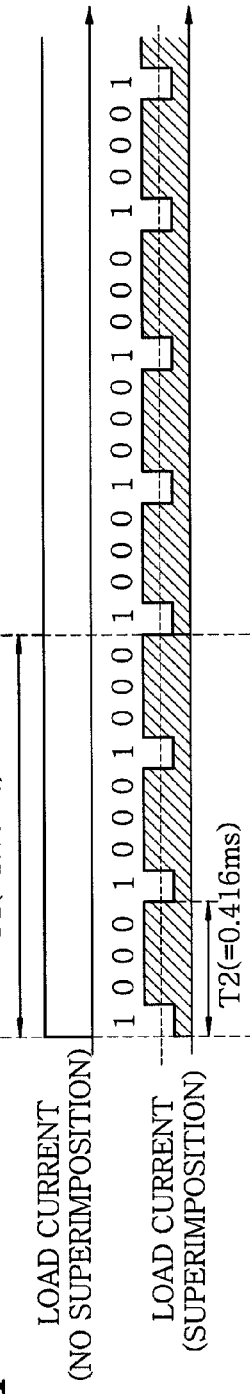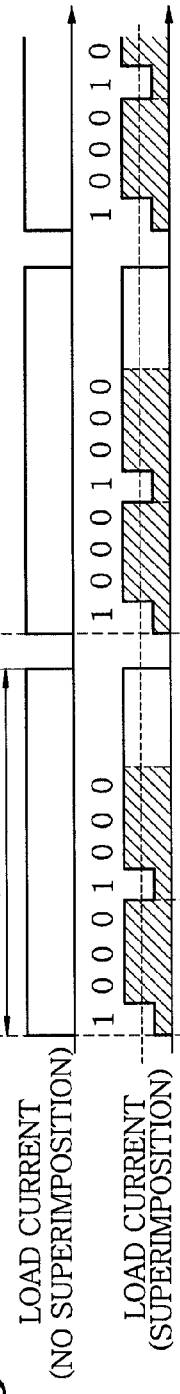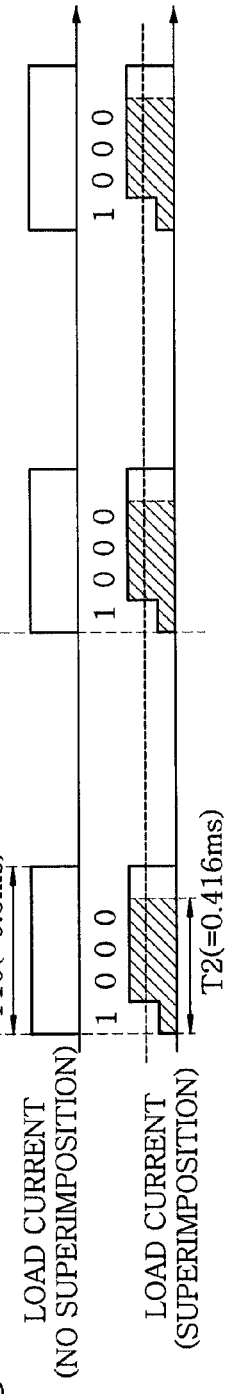

ILLUMINATION LIGHT COMMUNICATION DEVICE, AND ILLUMINATION APPARATUS AND SYSTEM INCLUDING SAME

FIELD OF THE INVENTION

The present invention relates to an illumination light communication device performing visible light communication by modulating an intensity of illumination light, and an illumination apparatus and illumination system including same.

BACKGROUND OF THE INVENTION

In recent years, there has been proposed an illumination apparatus with a visible light communication function to transmit a variety of information in a free space by using illumination light. Such illumination apparatus is disclosed in, e.g., Japanese Patent Application Publication No. 2011-34713. The illumination apparatus described in Japanese Patent Application Publication No. 2011-34713 includes a light emitting portion substrate on which light emitting diodes serving as semiconductor light emitting elements are disposed, a lighting circuit substrate which is connected to the light emitting portion substrate to control lighting of the light emitting diodes, and a visible light communication control substrate which performs a visible light communication control of the light emitting diodes. The visible light communication control substrate is detachably connected between the lighting circuit substrate and the light emitting portion substrate, and thus, in this conventional example, it is possible to generalize the design of the illumination apparatuses with/without the visible light communication function.

In the conventional example, the visible light communication is carried out by modulating an intensity of the illumination light based on an information signal (communication signal) to be transmitted. In other words, in an illumination light communication device on the transmitting side, the communication signal is superimposed on the illumination light by turning on/off an illumination light outputted from a light source unit including the light emitting diodes as a light source. Then, a receiver on the receiving side receives the communication signal by detecting a difference between a light intensity when the pulse of the communication signal is not superimposed and a light intensity when the pulse of the communication signal is superimposed.

In case of an amplitude control in which a dimming control of the light source unit is performed by varying the magnitude of a load current, the load current continuously flows without interruption. Thus, the communication signal also can be continuously superimposed. However, in case of a PWM control in which a dimming control of the light source unit is performed by alternately repeating a period during which a load current flows and a period during which no load current flows, the communication signal cannot be superimposed in the period during which no load current flows, and thus, there is a possibility that the visible light communication may be interrupted.

SUMMARY OF THE INVENTION

In view of the above, the present invention provides an illumination light communication device capable of performing visible light communication without interruption even when a dimming control of a light source unit is performed by a PWM control, and an illumination apparatus and illumination system including same.

In accordance with an embodiment of the present invention, there is provided an illumination light communication device including: a light source unit including light emitting elements; a power supply unit which controls a load current flowing through the light source unit to be maintained at a constant value; a switch element connected in series to the light source unit; and a control unit configured to control on/off of the switch element to modulate a light intensity of illumination light from the light source unit such that a binary communication signal is superimposed on the illumination light. Further, the control unit has a switching circuit to open and close a path connecting between the light source unit and the power supply unit, controls on/off of the switching circuit based on a dimming signal to perform a dimming control on the illumination light from the light source unit by a PWM control, and allows the communication signal to be superimposed on the illumination light from the light source unit in synchronization with an ON time of the switching circuit.

Further, if the communication signal of one symbol is superimposed on the illumination light from the light source unit, the control unit may not allow the communication signal to be superimposed until a next ON time of the switching circuit.

Further, the control unit may perform the dimming control on the illumination light from the light source unit such that the ON time is not shorter than one symbol time of the communication signal.

Further, a cycle of the dimming signal may be set to be an integer multiple of one symbol time of the communication signal.

Further, if the ON time is shorter than one symbol time of the communication signal, the control unit may stop superimposing the communication signal on the illumination light from the light source unit.

Further, the illumination light communication device described above may further include an impedance unit connected in parallel to the switch element, and the control unit may allow the impedance unit to be connected to or disconnected from the light source unit by controlling the on/off of the switch element to modulate the light intensity of the illumination light from the light source unit such that the binary communication signal is superimposed on the illumination light.

In accordance with another embodiment of the present invention, there is provided an illumination apparatus including an apparatus body having the illumination light communication device described above.

In accordance with still another embodiment of the present invention, there is provided an illumination system including: the illumination light communication device described above; and a receiver which receives the communication signal transmitted from the illumination light communication device.

In accordance with the present invention, the visible light communication can be performed without interruption even when the dimming control of the light source unit is performed by the PWM control.

BRIEF DESCRIPTION OF THE DRAWINGS

The objects and features of the present invention will become apparent from the following description of embodiments, given in conjunction with the accompanying drawings, in which:

FIGS. 1A and 1B are views showing an illumination light communication device in accordance with a first embodiment of the present invention, wherein FIG. 1A is a schematic circuit diagram and FIG. 1B is a waveform diagram when a dimming rate is 100%;

FIG. 2 is a view for explaining visible light communication in the illumination light communication device;

FIGS. 3A and 3B illustrate waveform diagrams showing a correlation between a communication signal and a load current in the illumination light communication device;

FIGS. 4A to 4C illustrate waveform diagrams of the load current in case of changing the dimming rate in the illumination light communication device, wherein FIG. 4A shows a case when the dimming rate is 90%, FIG. 4B shows a case when the dimming rate is 50%, and FIG. 4C shows a case when the dimming rate is 41.6%;

FIGS. 5A to 5C illustrate waveform diagrams of the load current in case of changing the dimming rate in an illumination light communication device in accordance with a second embodiment of the present invention, wherein FIG. 5A shows a case when the dimming rate is 100%, FIG. 5B shows a case when the dimming rate is 90%, and FIG. 5C shows a case when the dimming rate is 40%;

FIGS. 8A and 8B illustrate an illumination system in accordance with a fourth embodiment of the present invention, wherein FIG. 8A is a schematic view of the illumination system and FIG. 8B is a schematic view of a receiver.

DETAILED DESCRIPTION OF THE EMBODIMENTS

First Embodiment

Hereinafter, an illumination light communication device in accordance with a first embodiment of the present invention will be described with reference to the accompanying drawings which form a part hereof.

Figure 1A:
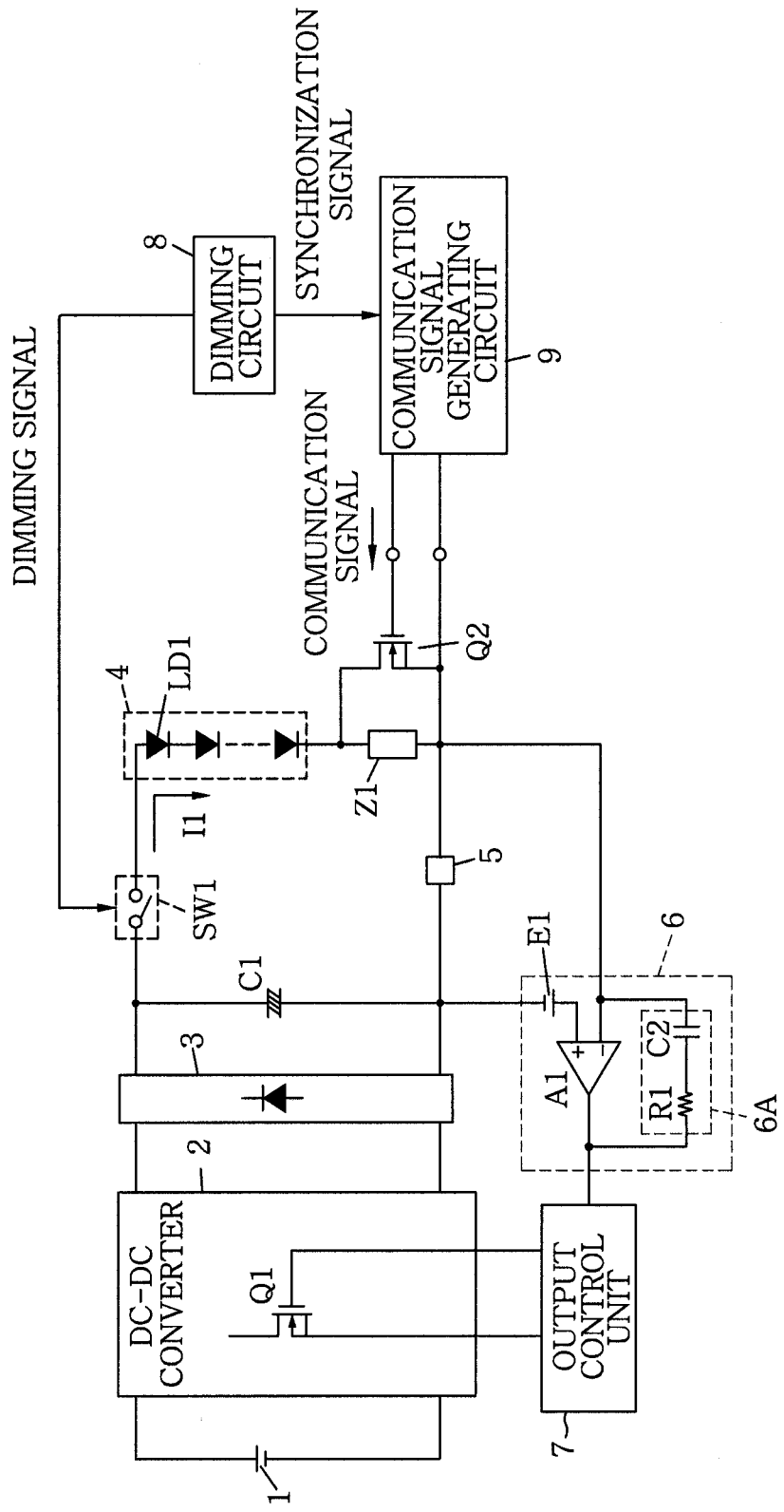

The illumination light communication device in this embodiment includes, as shown in FIG. 1A, a DC-DC converter 2 connected to a DC power supply 1 as an input source, a rectifier circuit 3 having a diode and a smoothing capacitor C1. The DC-DC converter 2 converts a DC voltage from the DC power supply 1 to a predetermined DC voltage by switching it through a switch element Q1 such as a MOSFET and rectifying and smoothing its output through the rectifier circuit 3 and the smoothing capacitor C1.

Connected in series between output terminals of the DC-DC converter 2, i.e., across the smoothing capacitor C1, are a light source unit 4 including light emitting diodes (light emitting elements) LD1 and a current detection resistor 5. One end of the current detection resistor 5 is connected to an inverting input terminal of an error amplifier A1. Accordingly, a potential of one end of the current detection resistor 5 is inputted to the inverting input terminal of the error amplifier A1. The other end of the current detection resistor 5 is connected to a non-inverting input terminal of the error amplifier A1 via a reference voltage source E1. Thus, the error amplifier A1 outputs, to an output control unit 7, a signal obtained by amplifying a difference between a voltage drop through the current detection resistor 5 and a source voltage of the reference voltage source E1.

The output control unit 7 controls the on/off of the switch element Q1 based on a feedback signal inputted from the error amplifier A1. Accordingly, the output control unit 7 controls a load current I1 flowing through the light source unit 4 to be maintained at a constant value.

In addition, a phase compensation circuit 6A including a resistor R1 and a capacitor C2 serving as an integral element is connected between the output terminal and the inverting input terminal of the error amplifier A1. The phase compensation circuit 6A adjusts a phase of the feedback signal by suppressing the gain in a high frequency region while increasing the gain in a low frequency region. A constant current feedback circuit 6 is configured to include the error amplifier A1 and the phase compensation circuit 6A.

That is, in this embodiment, a power supply unit for controlling the load current I1 flowing through the light source unit 4 is configured to include the DC power supply 1, the DC-DC converter 2, the rectifier circuit 3, the smoothing capacitor C1, the current detection resistor 5, the constant current feedback circuit 6 and the output control unit 7.

Connected in series to the light source unit 4 is a parallel circuit of an impedance unit Z1 and a switch element Q2. The switch element Q2 is, for example, a MOSFET and is turned on/off by a communication signal that is outputted from a communication signal generating circuit 9 which will be described later. The impedance unit Z1 includes, e.g., an impedance element (not shown) such as a resistor. Accordingly, in this embodiment, by controlling the on/off of the switch element Q2 based on the communication signal, the impedance unit Z1 can be connected to or disconnected from the light source unit 4. Thus, it is possible to change the magnitude of the load current I1 flowing through the light source unit 4, i.e., the light intensity of the illumination light outputted from the light source unit 4. Consequently, the binary communication signal can be superimposed on the illumination light from the light source unit 4 by modulating the light intensity of the illumination light from the light source unit 4.

Further, a dimming circuit 8 and a switching circuit SW1 are further provided in this embodiment, as shown in FIG. 1A. The dimming circuit 8 generates a dimming signal to perform a dimming control on the light source unit 4. Specifically, the dimming circuit 8 receives a signal transmitted from an external device such as a remote control (not shown), and generates a dimming signal based on information on a dimming rate included in the received signal.

Further, the dimming circuit 8 outputs the generated dimming signal to the switching circuit SW1 to be described later. In this embodiment, the frequency of the dimming signal is set to 1 kHz. Further, the dimming circuit 8 generates a synchronization signal synchronized with the dimming signal and outputs the synchronization signal to the communication signal generating circuit 9.

The communication signal generating circuit 9 generates the binary communication signal to be superimposed on the illumination light by modulating the light intensity of the illumination light from the light source unit 4 and outputs the binary communication signal to the switch element Q2. For example, the communication signal generating circuit 9 may be configured to generate the binary communication signal on the basis of a transmission signal inputted from an external device (not shown). The communication signal generating circuit 9 generates the communication signal based on the synchronization signal inputted from the dimming circuit 8, and outputs the communication signal to the switch element Q2. Thus, in this embodiment, the communication signal is superimposed on the illumination light from the light source unit 4 in synchronization with the dimming signal.

The switching circuit SW1 is connected in series to the light source unit 4 and is switched on/off on the basis of the dimming signal applied from the dimming circuit 8 to open and close a path connecting between the smoothing capacitor C1 and the light source unit 4. Accordingly, the dimming control of the light source unit 4 can be performed by a so-called PWM control in which a period (ON time of the switching circuit SW1) during which the load current I1 flows through the light source unit 4 and a period (OFF time of the switching circuit SW1) during which no load current I1 flows through the light source unit 4 are alternately repeated. In other words, in this embodiment, a control unit is configured to include the dimming circuit 8, the communication signal generating circuit 9 and the switching circuit SW1, so that the communication signal is superimposed on the illumination light outputted from the light source unit 4 by controlling the on/off of the switch element Q2 and the dimming control on the illumination light from the light source unit 4 is performed by the PWM control.

Hereinafter, an operation of visible light communication in this embodiment will be described. First, a modulation scheme of the visible light communication employed in this embodiment will be described. The visible light communication is carried out by modulating the light intensity of the illumination light from the light source unit 4 by using the communication signal, and a four pulse position modulation (4PPM) scheme is employed as its modulation scheme. The four pulse position modulation is to transmit two bits of data by dividing one cycle of the communication signal defined as a symbol time into four slots, and inputting a pulse to any one of these slots, as shown in FIG. 2.

For example, as shown in FIG. 2, if the communication signal (4PPM signal) in one symbol time is "1000", data of "00" can be transmitted, and if the communication signal in one symbol time is "0100", data of "01" can be transmitted. Similarly, if the communication signal in one symbol time is "0010", data of "10" can be transmitted, and if the communication signal in one symbol time is "0001", data of "11" can be transmitted.

Further, the four pulse position modulation of this embodiment has been established in "visible light ID system" (CP-1222) standard of Japan Electronics and Information Technology Industries Association (JEITA). In addition, in this embodiment, a data transmission rate is 4.8 kbps, and a data transmission rate of the communication signal (4PPM signal) is 9.6 kbps, which is twice of 4.8 kbps. Therefore, in this embodiment, one slot time is 0.104 ms, and one symbol time is 0.416 ms, which is four times of 0.104 ms.

In a method of increasing the light intensity of the illumination light from the light source unit 4 when the pulse of the communication signal is superimposed on the illumination light and reducing the light intensity of the illumination light from the light source unit 4 when the pulse of the communication signal is not superimposed on the illumination light, the light emission time having a large light intensity per symbol time is 25%, and the illumination efficiency becomes poor.

However, in this embodiment, as shown in FIG. 3, there has been employed a method in which the light intensity of the illumination light from the light source unit 4 is reduced when the pulse of the communication signal is superimposed on the illumination light and is increased when the pulse of the communication signal is not superimposed on the illumination light. Accordingly, the light emission time having a large light intensity per symbol time is ensured to be at least 75%, thereby improving the illumination efficiency. Further, in this embodiment, the load current I1 flows through the light source unit 4 even when the pulse of the communication signal is superimposed on the illumination light as will be described later, so that the illumination efficiency is improved by lengthening the light emission time.

In addition, in this embodiment, the light intensity of the illumination light from the light source unit 4 is modulated by connecting or disconnecting the impedance unit Z1 with the light source unit 4. Therefore, even when the pulse of the communication signal is superimposed on the illumination light, the load current I1 does not become zero and continues to flow at a constant current value. For this reason, there is an advantage that it is easy for a receiver (not shown) to determine a timing of initiating the superimposition of the pulse of the communication signal, particularly in case of superimposing the communication signal "1000".

In other words, in a configuration in which the load current I1 becomes zero when the pulse of the communication signal is superimposed on the illumination light, when the communication signal "1000" is received by the receiver, there is no change in the light intensity before and after the superimposition of "1". Thus, it is difficult to determine a timing of initiating the superimposition of the pulse of the communication signal.

On the other hand, in this embodiment, before the superimposition of "1", the light source unit 4 is turned off, and thus the load current I1 does not flow. When the superimposition of "1" occurs, the light source unit 4 is turned on and the load current I1 flows. Accordingly, there is a change in the light intensity between before and after the superimposition of "1". Thus, the receiver can easily determine a timing of initiating the superimposition of the pulse of the communication signal by detecting the change in the light intensity.

Next, the visible light communication will be described for the case when the dimming control on the illumination light from the light source unit 4 is performed by a PWM control. In a conventional method, when the dimming control on the illumination light from the light source unit 4 is performed by the PWM control, the communication signal may be continuously superimposed on the load current if the load current flows continuously without interruption.

Figure 1B:
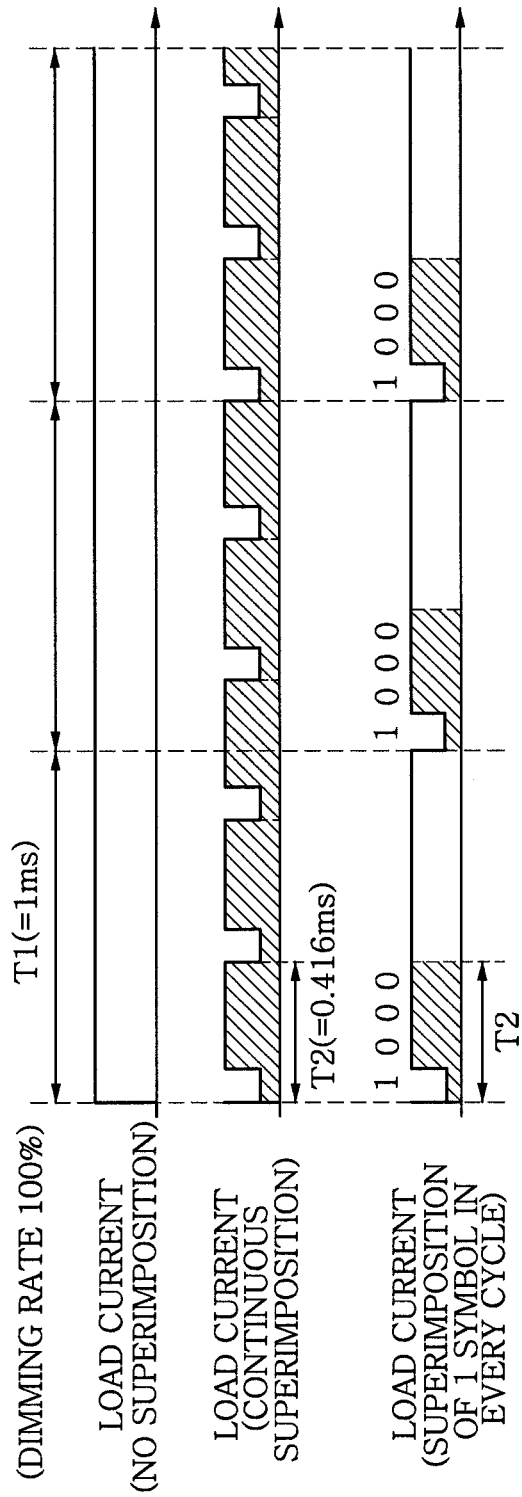

For example, as in the case shown in the middle of FIG. 1B, if a dimming rate is 100%, the load current I1 flows continuously without interruption. Thus, there is no problem continuously superimposing the communication signal on the load current. However, if a dimming rate is lowered, an OFF period of the switching circuit SW1 occurs in a cycle T1 (=1 ms) of the dimming signal, which results in making a period during which the load current I1 does not flow. In this period, the illumination light is not outputted from the light source unit 4. Therefore, in the method in which the communication signal is continuously superimposed on the load current I1, during such period, the communication signal cannot be superimposed, so that the visible light communication is interrupted.

In this embodiment, as shown in FIG. 1A, the dimming circuit 8 generates a synchronization signal synchronized with the dimming signal being applied to the switching circuit SW1, and inputs the synchronization signal to the communication signal generating circuit 9. Then, the communication signal generating circuit 9 inputs the communication signal to the switch element Q2 in synchronization with the inputted synchronization signal. Accordingly, in this embodiment, as in the case shown at the bottom of FIG. 1B, the communication signal is synchronized with the ON time of the switching circuit SW1, and the communication signal of one symbol is superimposed in every cycle T1 of the dimming signal.

Then, if the communication signal of one symbol is superimposed in one cycle, the communication signal generating circuit 9 does not generate a communication signal until the next synchronization signal is inputted. That is, in this embodiment, if the communication signal of one symbol is once superimposed on the illumination light from the light source unit 4, no communication signal is further superimposed until the next ON time of the switching circuit SW1.

For example, as shown in FIGS. 4A and 4B, even when the dimming rate is changed from 90% to 50%, the communication signal is not interrupted in contrast to a case when the communication signal is continuously superimposed since the communication signal of one symbol per one cycle T1 is superimposed in synchronization with an ON time T10 of the switching circuit SW1. Then, the receiver (not shown) continuously receives the communication signal of each time zone by detecting the light intensity of the illumination light from the light source unit 4 in the time zone in which the illumination light is irradiated from the light source unit 4.

In the case where the communication signal is continuously superimposed, 2400 symbols, i.e., 4800 bits of data, can be transmitted per second since a symbol time T2 of the communication signal of this embodiment is 0.416 ms. On the other hand, in this embodiment, the communication signal of one symbol is only superimposed in every cycle T1 of the dimming signal, and 1000 symbols, i.e., 2000 bits of data, can be transmitted per second since one cycle T1 of the dimming signal is 1 ms.

Therefore, in this embodiment, while allowing the communication signal to be transmitted without interruption, the amount of data transmitted per second, i.e., a data transmission rate is reduced. However, when information having a small amount of data such as ID information is transmitted by using the communication signal, the data transmission rate of this embodiment is sufficiently fast enough.

As mentioned above, in this embodiment, the communication signal is superimposed on the illumination light from the light source unit 4 in synchronization with the ON time T10 of the switching circuit SW1. In addition, in this embodiment, when the communication signal of one symbol (in one cycle) is superimposed once on the illumination light from the light source unit 4, the communication signal is not further superimposed until the next ON time of the switching circuit SW1. Thus, in this embodiment, even if the dimming rate is varied, the communication signal is superimposed during the ON time T10 of the switching circuit SW1 and the communication signal is not superimposed during the OFF time of the switching circuit SW1, so that the communication signal is not interrupted.

Therefore, in this embodiment, even when the dimming control on the illumination light from the light source unit 4 is performed by the PWM control, the visible light communication can be performed without interruption.

Further, when the ON time T10 of the switching circuit SW1 is shorter than the symbol time T2 of the communication signal, the communication signal cannot be superimposed on the illumination light from the light source unit 4. For this reason, it is necessary for the dimming circuit 8 to perform the PWM control such that the ON time T10 of the switching circuit SW1 is not shorter than the symbol time T2 of the communication signal. In this embodiment, the cycle T1 of the dimming signal is 1 ms and the symbol time T2 of the communication signal is 0.416 ms, as shown in FIG. 4C. Thus, the dimming rate of 41.6% at which the ON time T10 of the switching circuit SW1 becomes 0.416 ms is a lower limit of the dimming control performed by the PWM control.

Moreover, in the case where the dimming rate is 100%, there is no period during which the load current I1 does not flow. Accordingly, it may be controlled such that the communication signal is continuously superimposed on the illumination light from the light source unit 4 only in this case.

Second Embodiment

Hereinafter, an illumination light communication device in accordance with a second embodiment of the present invention will be described with reference to the accompanying drawings. Further, since a basic configuration of the second embodiment is the same as that of the first embodiment, like reference numerals will be given to like parts, and a redundant description thereof will be omitted. In this embodiment, as shown in FIG. 5A, the cycle T1 of the dimming signal is changed from 1 ms to 1.25 ms by changing the frequency of the dimming signal from 1 kHz to 800 Hz. Further, in this embodiment, if the ON time T10 of the switching circuit SW1 is long enough, the communication signal is superimposed as much as possible.

For example, as shown in FIG. 5B, if the dimming rate is 90%, the ON time T10 of the switching circuit SW1 is 1.125 ms, which is more than twice of the symbol time T2 of the communication signal. Therefore, the communication signal of two symbols can be superimposed in every cycle T1 of the dimming signal.

In this scheme, the communication signal of two symbols can be superimposed in every cycle T1 of the dimming signal until the dimming rate reaches $100*(2/3)\%$, and the communication signal of one symbol is superimposed in the same manner as the first embodiment at the dimming rate less than $100*(2/3)\%$. For example, as shown in FIG. 5C, if the dimming rate is 40%, the ON time T10 of the switching circuit SW1 is 0.5 ms, which is smaller than twice of the symbol time T2 of the communication signal. Thus, the communication signal of one symbol is superimposed in every cycle T1 of the dimming signal.

In addition, in this embodiment, the cycle T1 of the dimming signal is 1.25 ms and the symbol time T2 of the communication signal is 0.416 ms. Thus, the dimming rate of $100*(1/3)\%$ at which the ON time T10 of the switching circuit SW1 becomes about 0.416 ms is a lower limit of the dimming control performed by the PWM control.

As mentioned above, in this embodiment, the lower limit of the dimming control performed by the PWM control can be lowered by reducing the frequency of the dimming signal to thereby lengthen the cycle T1 of the dimming signal, and therefore the dimming control can be further performed to the lower level (to darken) compared to the first embodiment. Further, in this embodiment, if the ON time T10 of the switching circuit SW1 is long enough, the data transmission amount per second can be increased and the data transmission rate can also be improved by superimposing the communication signal as much as possible.

As in this embodiment, it is possible to improve the data transmission rate by reducing the frequency of the dimming signal, but a flicker may occur in the illumination light because a turned-off period of the light source unit 4 becomes longer as the frequency of the dimming signal is reduced. In this way, since there is a trade-off relationship between the data transmission rate of the visible light communication and the stability of the dimming control of the light source unit 4, it is preferable that the frequency of the dimming signal is set so as not to cause a flicker in the illumination light.

Figure 6:
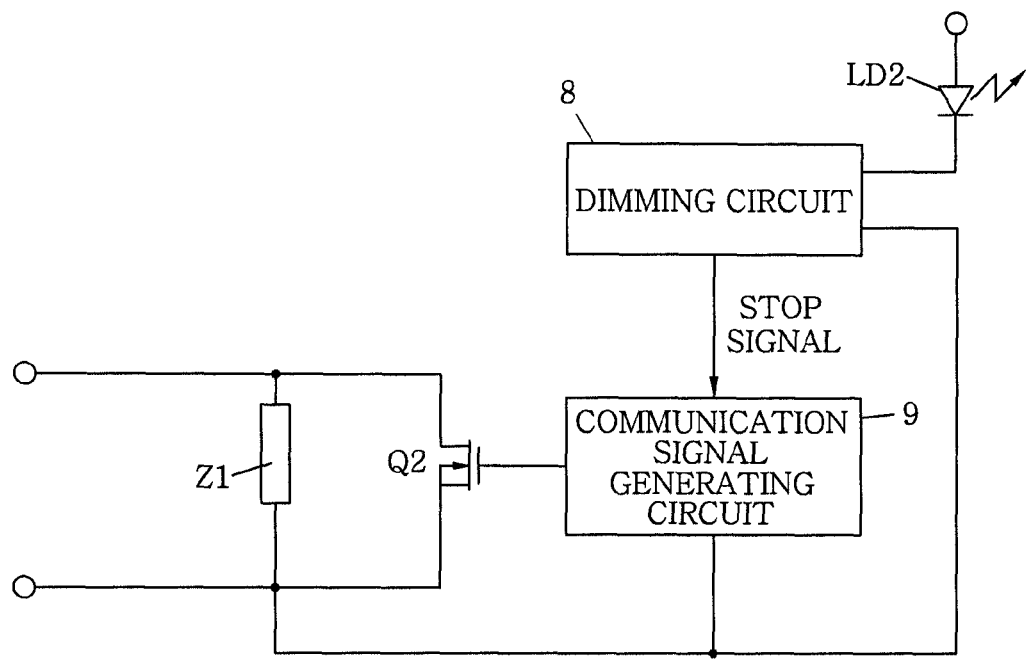
FIG. 6 is a schematic circuit diagram showing another configuration of the illumination light communication device.

In each of the embodiments described above, when the ON time T10 of the switching circuit SW1 becomes shorter than the symbol time T2 of the communication signal, i.e., when the dimming rate becomes lower than the lower limit, superimposing the communication signal on the illumination light from the light source unit 4 is stopped. Specifically, as shown in FIG. 6, the dimming circuit 8 compares the ON time T10 of the switching circuit SW1 with the symbol time T2 of the communication signal and outputs a stop signal to the communication signal generating circuit 9 when the ON time T10 becomes shorter than the symbol time T2. The communication signal generating circuit 9 stops generating the communication signal when the stop signal is inputted. Thus, it is possible to prevent an unnecessary communication signal from being generated.

In order to notify that the superimposition of the communication signal is stopped, it may be configured such that, e.g., a light emitting diode LD2 for a status display is connected to the dimming circuit 8 and emits light upon receipt of the stop signal. By this configuration, it is possible to inform a user that the visible light communication is stopped. Instead of providing the light emitting diode LD2, it may be configured to notify that the superimposition of the communication signal is stopped by outputting a sound through a speaker (not shown).

Further, in each of the embodiments described above, the light emitting diodes LD1 are used as light emitting elements included in the light source unit 4. However, without being limited thereto, other light emitting elements such as organic electroluminescence (EL) elements and semiconductor lasers may be used.

In addition, in each of the embodiments described above, the cycle T1 of the dimming signal may be set to an integer multiple of the symbol time T2 of the communication signal.

Third and Fourth Embodiments

Figure 7A:
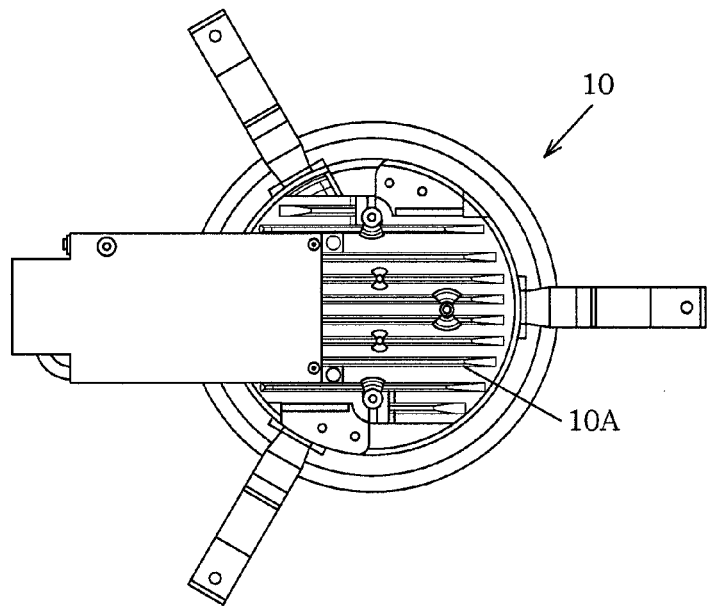
FIGS. 7A to 7C illustrate an illumination apparatus in accordance with a third embodiment of the present invention.
Figure 7B:
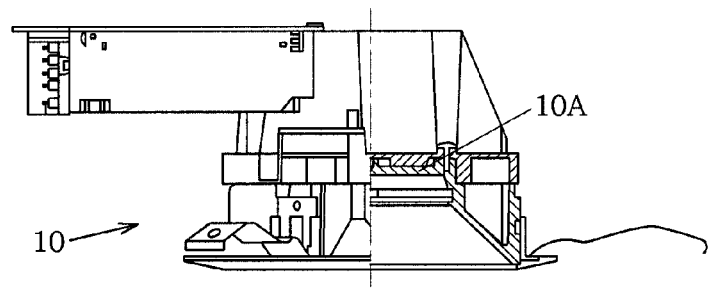
Figure 7C:
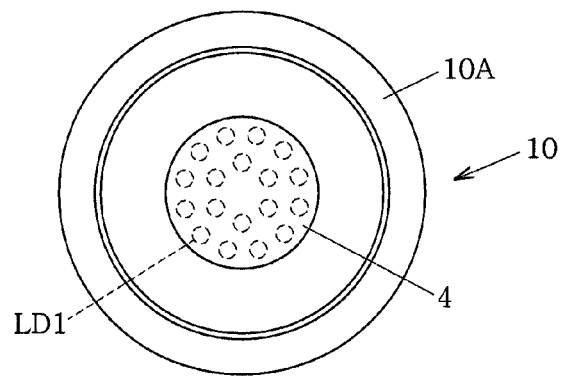

Hereinafter, an illumination apparatus and an illumination system in accordance with a third and a fourth embodiment of the present invention will be described with reference to the drawings. Further, in the following description, a direction extending up and down in FIG. 7B is referred to as a vertical direction. First, the illumination apparatus will be described. An illumination apparatus 10 of this embodiment is, e.g., of a down light with a mortar-shaped apparatus body 10A whose bottom is open as shown in FIG. 7A to 7C. Further, the illumination light communication device (not shown) of one of the first and the second embodiment is retained in the apparatus body 10A. The light source unit 4 included in the illumination light communication device is disposed to face an external space through a bottom opening of the apparatus body 10A and irradiates illumination light toward the external space. In addition, the illumination apparatus 10 may be an illumination apparatus having other configurations without being limited to the down light.

Since the illumination light communication device of one of the first and the second embodiment is used in this embodiment, the visible light communication can be performed without interruption even when the dimming control on the illumination light from the light source unit 4 is performed by the PWM control.

Figure 8A:
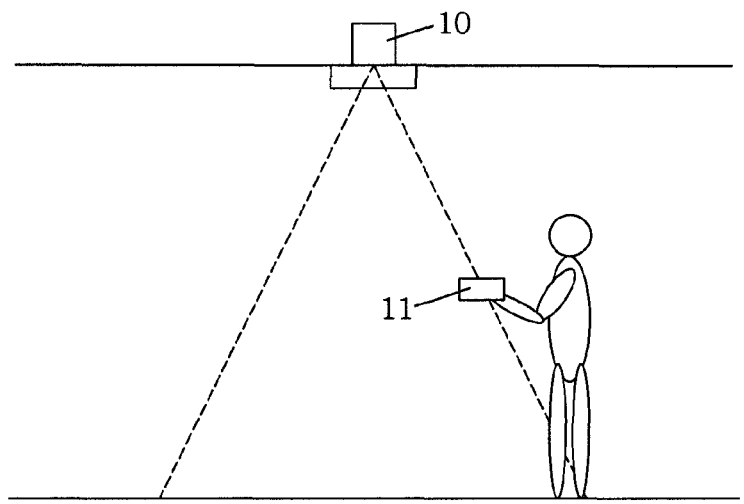

Next, the illumination system in accordance with the fourth embodiment of the present invention will be described. The illumination system in this embodiment includes, as shown in FIG. 8A, the illumination light communication device (not shown) of one of the first and the second embodiment and a receiver 11 which receives the communication signal transmitted from the illumination light communication device. Further, in this embodiment, the illumination light communication device is retained in the illumination apparatus 10 embedded in the ceiling.

Figure 8B:
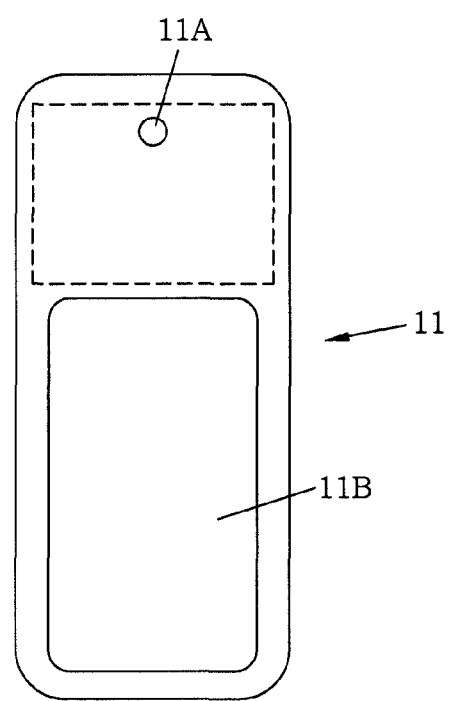

The receiver 11 is formed of, e.g., a mobile terminal and includes a photodiode 11A receiving the illumination light irradiated from the illumination apparatus 10, as shown in FIG. 8B. Further, the receiver 11 includes a display unit 11B formed of, e.g., a liquid crystal monitor or the like, an operation unit (not shown), and a processing circuit (not shown) which reads the communication signal based on the light intensity of the illumination light received by the photodiode 11A. Further, the operation unit may be implemented by configuring the display unit 11B as a touch panel. In addition, the receiver 11 may be a receiver having other configurations without being limited to the mobile terminal.

Therefore, as shown in FIG. 8A, the user is in possession of the receiver 11 and can receive the communication signal superimposed on the illumination light from the illumination apparatus 10 within an illumination range of the illumination apparatus 10. Thus, the receiver 11 detects, e.g., position information contained in the communication signal and displays an image on the receiver 11 or outputs voice through a built-in speaker, thereby informing the user of a current position. Further, the purpose of this embodiment may be any other purpose without being limited to the purpose of informing the user of the current position.

Further, since the illumination light communication device of one of the first and the second embodiment is used in this embodiment, the visible light communication can be performed without interruption even when the dimming control on the illumination light from the light source unit 4 is performed by the PWM control.

Further, although the four pulse position modulation (4PPM) scheme is employed as a modulation scheme of the visible light communication in the above embodiments, modulation schemes other than the 4PPM scheme may also be employed.

Moreover, the above-described embodiments may be combined with each other, and the configurations of the embodiments may be applied to each other.

While the invention has been shown and described with respect to the embodiments, it will be understood by those skilled in the art that various changes and modification may be made without departing from the scope of the invention as defined in the following claims.

What is claimed is:

1. An illumination light communication device comprising:
    a light source unit including light emitting elements;
    a power supply unit which controls a load current flowing through the light source unit to be maintained at a constant value;
    a switch element connected in series to the light source unit; and
    a control unit configured to control on/off of the switch element to modulate a light intensity of illumination light from the light source unit such that a binary communication signal is superimposed on the illumination light,
    wherein the control unit has a switching circuit to open and close a path connecting between the light source unit and the power supply unit, controls on/off of the switching circuit based on a dimming signal to perform a dimming control on the illumination light from the light source unit by a PWM control, and allows the communication signal to be superimposed on the illumination light from the light source unit in synchronization with an ON time of the switching circuit.

2. The illumination light communication device of claim 1, wherein if the communication signal of one symbol is superimposed on the illumination light from the light source unit, the control unit does not allow the communication signal to be superimposed until a next ON time of the switching circuit.

3. The illumination light communication device of claim 1, wherein the control unit performs the dimming control on the illumination light from the light source unit such that the ON time is not shorter than one symbol time of the communication signal.

4. The illumination light communication device of claim 2, wherein the control unit performs the dimming control on the illumination light from the light source unit such that the ON time is not shorter than one symbol time of the communication signal.

5. The illumination light communication device of claim 1, wherein a cycle of the dimming signal is set to be an integer multiple of one symbol time of the communication signal.

6. The illumination light communication device of claim 2, wherein a cycle of the dimming signal is set to be an integer multiple of one symbol time of the communication signal.

7. The illumination light communication device of claim 1, wherein if the ON time is shorter than one symbol time of the communication signal, the control unit stops superimposing the communication signal on the illumination light from the light source unit.

8. The illumination light communication device of claim 2, wherein if the ON time is shorter than one symbol time of the communication signal, the control unit stops superimposing the communication signal on the illumination light from the light source unit.

9. The illumination light communication device of claim 1, further comprising an impedance unit connected in parallel to the switch element, wherein the control unit allows the impedance unit to be connected to or disconnected from the light source unit by controlling the on/off of the switch element to modulate the light intensity of the illumination light from the light source unit such that the binary communication signal is superimposed on the illumination light.

10. The illumination light communication device of claim 2, further comprising an impedance unit connected in parallel to the switch element, wherein the control unit allows the impedance unit to be connected to or disconnected from the light source unit by controlling the on/off of the switch element to modulate the light intensity of the illumination light from the light source unit such that the binary communication signal is superimposed on the illumination light.

11. An illumination apparatus comprising an apparatus body including the illumination light communication device described in claim 1.

12. An illumination apparatus comprising an apparatus body including the illumination light communication device described in claim 2.

13. An illumination system comprising:
the illumination light communication device described in claim 1; and
a receiver which receives the communication signal transmitted from the illumination light communication device.

14. An illumination system comprising:
the illumination light communication device described in claim 2; and
a receiver which receives the communication signal transmitted from the illumination light communication device.

* * * * *